Henry W. Putnam.
Apparatus for filling bottles.
No. 4050. REISSUED JUN 28 1870.
Fig. 2.
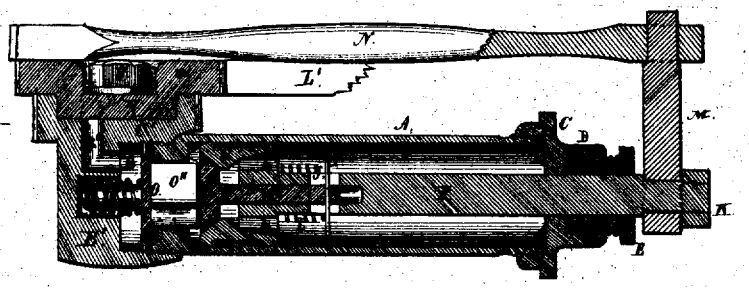
Fig. 4.
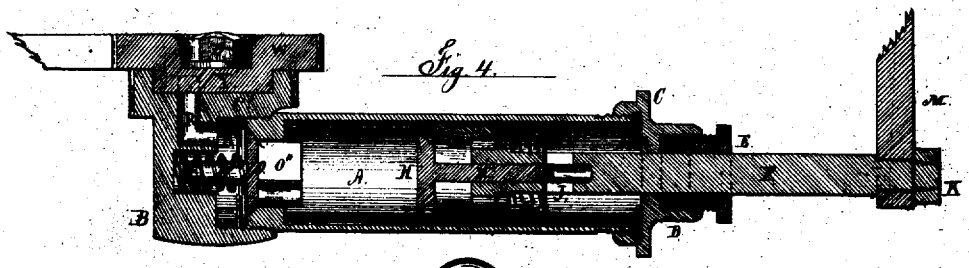
Fig. 6.
Fig. 3.
Henry W. Putnam,
Samuel W. Pierell
Atty.
Fig. 1.
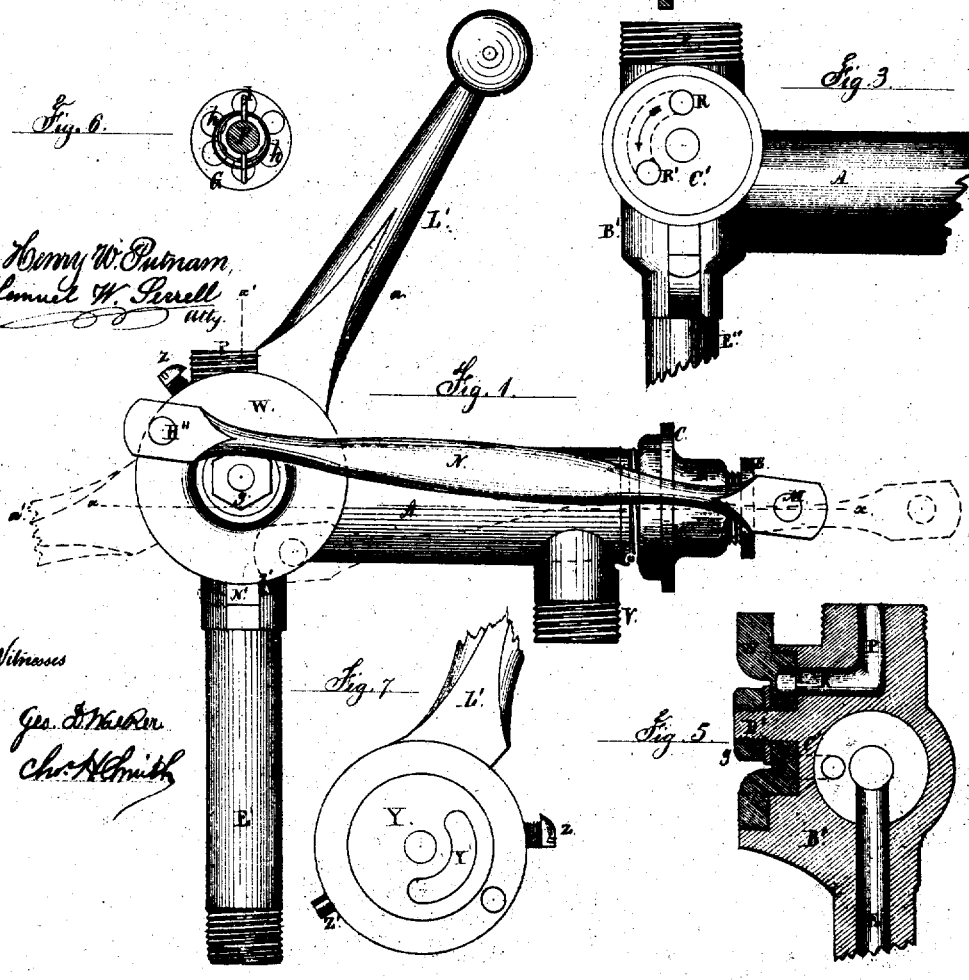
Fig. 7.
Fig. 5.
Witnesses
Geo. D. Walker
Chas. H. Smith

United States Patent Office.

HENRY W. PUTNAM, OF BENNINGTON, VERMONT.

*Letters Patent No.* 33,602, *dated October* 29, 1861; *reissue No.* 4,050, *dated June* 28, 1870

IMPROVED APPARATUS FOR FILLING BOTTLES.

The Schedule referred to in these Letters Patent and making part of the same

*To all whom it may concern:*

Be it known that I, HENRY W. PUTNAM, now of Bennington, in the county of Bennington and State of Vermont, have invented a certain new and useful Improvement in Apparatus for Filling Bottles; and I do hereby declare that the following is a full and complete description thereof.

The ordinary way of filling bottles with sirup and mineral water is to pour in the sirup first with funnels and dippers. The bottles are then taken to another place and filled with mineral water from fountains charged with carbonic-acid gas, an ordinary faucet being used to cut off the same. The corks are then driven in and secured by twine or wire fasteners. This method requires one person to fill the bottles with sirup, another to handle them, and a third to put in mineral water.

My invention relates to the filling of bottles with two different liquids, in any relative quantity, by one apparatus. I make use of a pump that is actuated to supply a given quantity of liquid into the bottle, and, by a simultaneously-operated valve or cut-off, the other liquid is allowed to flow in.

This invention is especially designed for introducing a given quantity of sirup into a bottle, and then allowing a mineral water (such as water charged with carbonic acid) to pass into the bottle.

In the drawing—

Figure 1 is a top view;

Figure 2 is a vertical section in the direction of the line *x x*, fig. 1;

Figure 3 is a top view, with part of the apparatus removed;

Figure 4 is a vertical section, showing the pump as receiving the sirup;

Figure 5 is a vertical section in the direction of the line *x' x'* in fig. 1; and Figures 6 and 7 are detached sections, which will be referred to in the descriptions.

A represents a pump-barrel, with the cap C screwed upon one end, with the packing-box D and nut E. The piston G, with its rod, F, extending through the cap C, works in the barrel A, being properly packed; and the head of the piston has openings *h*, through it, (see fig. 6,) and the piston is made as a seat for the valve H.

The valve-stem H' extends into the piston-rod, and the pin I, in the valve-stem H', works in the slot J, in the piston-rod, to keep the valve in place and limit its movement.

The spiral spring L, between pin I and the piston-head, aids in keeping the valve H closed when the sirup is being forced into the bottle.

The head B' is screwed upon one end of the pump-barrel A, forming a chamber, B, at its end, in which works the valve O, said valve setting into the end of the pump-barrel A, and having wings O" on one side and the stem O' on the other, that passes inside of the spiral-spring S. This spring closes the valve O when pressure is removed, and the stem *o'* keeps it from opening too far, and getting out of place.

The upper side of the head B' is formed as a recessed seat, C,' for the valve Y, fig. 1.

R R' are openings, extending down from the seat C' into the tube P and chamber B, respectively, (see fig. 5.)

The pipe E', opening into the chamber B through the side of B', has at its outer end a pipe leading to the bottle to be filled, and the tube P leads to the mineral-water chamber or fountain.

The valve Y has on its face a curved slot, Y', (see fig. 7,) which, when the water is running into the bottle, is over the openings R R', (see dotted lines, fig. 3,) thus making a connection from the fountain to the chamber B and pipe E'; but when this valve Y is closed, the slot Y' is on the other side of the valve-seat, closing the connection from R to R'. The upper part of the valve Y is formed as a circular piece, W, and this piece W and valve Y are upon the standard or screw D', being retained in place by the nut *g*.

H" is a pin on the upper side of W, on which pin is placed one end of the connecting-rod N, the other end being upon the arm M, that is, upon the outer end of the piston-rod F, being secured thereon by the nut K.

The handle L' is formed with or attached to the piece W, so that, as the handle is moved, the valve Y, connecting-rod N, and piston G move with it.

The tube V, that opens into the side of the pump-barrel, is connected to the vessel that supplies sirup.

The filled bottle is taken away, and an empty one placed at the end of the pipe E', when the handle L' is in the position shown by dotted lines in fig. 1, and the piston, as in fig. 4.

The handle is brought around to the position shown by dotted lines in fig. 1, which movement causes the sirup to rush through the holes *h* and valve H and fill the other end of the pump-barrel. The movement of the handle in this direction is determined by the stop Z, in the side of the piece W, taking against pin N' (see dotted lines) and the requisite amount of sirup accurately adjusted, by changing the position of the stop Z in the edge of W. The handle now being swung around to the position shown by full lines in fig. 1, the pump-piston G is brought to the position shown in fig. 2, and the sirup or other liquid forced through the valve *o*, chamber B, and pipe E', into the bottle. This movement of the handle also brings the slot Y', in the valve Y, over the holes R R', opening the connection from the fountain to the chamber B, and the mineral water or liquid being under a pressure generally of four or more atmospheres, it rushes through R R′ and chamber B, in the direction of the arrow, (fig. 3,) into the bottle, filling the space which the sirup does not occupy. The movement of the handle in this direction is determined by the pin Z′ taking against the line N′, (see fig. 1.)

The movement of the piston G has ceased before the water-way Y′ is opened, in consequence of the connecting-rod N passing the center, and the spring S at the same time closes the valve O.

The bottle is to be corked and secured while under pressure from the fountain, in any usual manner.

When the handle is moved back from the position *a* to the position *a′*, the sirup passes through the piston G and valve, ready for the next operation.

The adjustment of the pin or screw Z varies the extent of motion allowed to the piston G, and, consequently, the proportion of sirup forced in each charge.

If it is desired to fill the bottle entirely with mineral water, the connecting-rod N must be removed.

By this apparatus the bottles are filled with a regular proportionate quantity of two liquids, such as sirup and mineral water, and that with much less labor than by the ordinary methods, as two persons can perform all the labor, heretofore requiring three persons in the old operation.

I claim as my invention—

1. A pump, to supply, by its movement, a measured quantity of one liquid into a bottle to be charged, in combination with a valve or cock to supply the other liquid to such bottle, substantially as specified.

2. The pump A, piston G, and valves, in combination with the plate W and water-ways R R′ Y′, substantially as and for the purposes specified.

Signed by me this 2d day of April, A D. 1870.

HENRY W. PUTNAM.

Witnesses:

WILLIAM G. T. WRIGHT,
JAMES B. MEASHAM.